US009729885B2

(12) United States Patent
Minaee et al.

(10) Patent No.: US 9,729,885 B2
(45) Date of Patent: Aug. 8, 2017

(54) APPARATUS AND METHOD FOR COMPRESSING COLOR INDEX MAP

(71) Applicant: Futurewei Technologies, Inc., Plano, TX (US)

(72) Inventors: Shervin Minaee, Brooklyn, NY (US); Haoping Yu, Carmel, IN (US)

(73) Assignee: Futurewei Technologies, Inc., Plano, TX (US)

( * ) Notice: Subject to any disclaimer, the term of this patent is extended or adjusted under 35 U.S.C. 154(b) by 190 days.

(21) Appl. No.: 14/620,059

(22) Filed: Feb. 11, 2015

(65) Prior Publication Data

US 2016/0234501 A1  Aug. 11, 2016

(51) Int. Cl.
*H04N 19/50* (2014.01)
*H04N 19/136* (2014.01)
(Continued)

(52) U.S. Cl.
CPC ......... *H04N 19/136* (2014.11); *G06K 9/4661* (2013.01); *G06K 9/6215* (2013.01);
(Continued)

(58) Field of Classification Search
CPC .. G06K 9/4661; G06K 9/6215; H04N 19/103; H04N 19/136; H04N 19/176;
(Continued)

(56) References Cited

U.S. PATENT DOCUMENTS 6,898,312 B2 * 5/2005 Schroder ............... H04N 1/628
345/593
8,693,537 B2 * 4/2014 Wang ................... H04N 19/176
375/240.08
(Continued)

FOREIGN PATENT DOCUMENTS

| CN | 102223541 A | 10/2011 |
|----|-------------|---------|
| CN | 102611888 A | 7/2012 |
| WO | 2015006245 A1 | 1/2015 |

OTHER PUBLICATIONS

Jianqiu et al, A wavelet based intra-frame coding algorithm focosing on face region, 2003.*

(Continued)

*Primary Examiner* — Shan Elahi
(74) *Attorney, Agent, or Firm* — Slater Matsil, LLP

(57) ABSTRACT

Embodiments are provided for compressing a color index map in video coding applications including screen content images. An embodiment method includes obtaining, at a video codec device, an image block, and generating a color index map comprising a plurality of entries and representing the image block. Each one of the entries is assigned a color index indicating a respective color. The method further includes assigning, in a correct prediction map, a first bit-value for each one of the entries that is predictable by a neighboring entry in the color index map, and a second bit-value for each one of the entries that is unpredictable by any neighboring entry in the color index map. Further, an actual value from the color index map for the each one of the entries that is unpredictable by any neighboring entry is added in a sequence of non-predictable color indices.

20 Claims, 3 Drawing Sheets

(51) Int. Cl.

| | | |
|---|---|---|
| *H04N 19/44* | (2014.01) | |
| *H04N 19/176* | (2014.01) | |
| *G06K 9/46* | (2006.01) | |
| *G06K 9/62* | (2006.01) | |
| *H04N 19/593* | (2014.01) | |
| *H04N 19/103* | (2014.01) | |
| *H04N 19/463* | (2014.01) | |
| *H04N 19/186* | (2014.01) | |
| *H04N 19/184* | (2014.01) | |

(52) U.S. Cl.
CPC ......... *H04N 19/103* (2014.11); *H04N 19/176* (2014.11); *H04N 19/184* (2014.11); *H04N 19/186* (2014.11); *H04N 19/44* (2014.11); *H04N 19/463* (2014.11); *H04N 19/50* (2014.11); *H04N 19/593* (2014.11)

(58) Field of Classification Search
CPC .... H04N 19/184; H04N 19/186; H04N 19/44; H04N 19/463; H04N 19/50; H04N 19/593
USPC ...................................................... 375/240.08
See application file for complete search history.

(56) References Cited

U.S. PATENT DOCUMENTS

| | | | | |
|---|---|---|---|---|
| 2007/0005795 | A1* | 1/2007 | Gonzalez | G06F 17/30017 709/232 |
| 2010/0098155 | A1* | 4/2010 | Demircin | H03M 7/4006 375/240.02 |
| 2010/0158400 | A1* | 6/2010 | Lu | H04N 19/176 382/238 |
| 2011/0080947 | A1* | 4/2011 | Chen | H04N 19/00763 375/240.12 |
| 2011/0228852 | A1* | 9/2011 | Budagavi | H04N 19/105 375/240.16 |
| 2011/0228858 | A1* | 9/2011 | Budagavi | H04N 19/70 375/240.25 |
| 2012/0002873 | A1* | 1/2012 | Iourcha | G06T 15/04 382/166 |
| 2012/0114039 | A1* | 5/2012 | Wang | H04N 19/197 375/240.13 |
| 2013/0301738 | A1* | 11/2013 | Kim | H04N 19/176 375/240.18 |
| 2014/0064612 | A1* | 3/2014 | Matsumura | G06T 9/00 382/166 |
| 2014/0233633 | A1* | 8/2014 | Hannuksela | H04N 21/23614 375/240.02 |
| 2014/0241630 | A1 | 8/2014 | Macinnis et al. | |
| 2015/0172678 | A1* | 6/2015 | Alshina | H04N 19/86 375/240.02 |
| 2015/0189302 | A1* | 7/2015 | Pu | H04N 19/176 375/240.24 |
| 2015/0281728 | A1* | 10/2015 | Karczewicz | H04N 19/93 375/240.16 |
| 2016/0100161 | A1* | 4/2016 | Chang | H04N 19/46 375/240.12 |

OTHER PUBLICATIONS

Chun et al, Design of high-performance unified motion estimation IP for H.264/MPEG-4 video CODEC, 2008.*

Voukelatos et al, Very low bit-rate color video coding using adaptive subband vector quantization with dynamic bit allocation, Apr. 2, 1997.*

Christopoulos, C., et all, "The JPEG2000 Still Image Coding System: An Overview," IEEE Transactions on Consumer Electronics, vol. 46, No. 4, Nov. 2000, pp. 1103-1127.

Bottou, L., et al., "High Quality Document Image Compression with DjVu," Journal of Electronic Imaging, vol. 7, Issue 3, pp. 410-425, Jul. 1998.

ISO/IEC JTC, "Joint Call for Proposals for Coding of Screen Content," 1/SC 29/WG 11 document N14175 and ITU-T Q6/16 document VCEG-AW90, San Jose, USA. Jan. 2014, 13 pages.

ITU/ISO/IEC, "RCE3 Test 2: Multi-stage Base Color and Index Map," Joint Collaborative Team on Video Coding (JCT-VC) of ITU-T SG 16 WP 3 and ISO/IEC JTC 1/SC 29/WG 11, Jul. 25-Aug. 2, 2013, 8 pages.

Marpe, D., "Context-based Adaptive Binary Arithmetic Coding in the H.264/AVC Video Compression Standard," IEEE Transactions on Circuits and Systems for Video Technology, vol. 13, No. 7, pp. 620-636, Jul. 2003.

ISO/IEC, "Standardization Plan for HEVC Extensions for Screen Content Coding," International Organization for Standardization, JTC1/SC29/WG11 N14520, Apr. 2013, 1 page.

Raguram, R. et al., "A Comparative Analysis of RANSAC Techniques Leading to Adaptive Real-time Random Sample Consensus," In: Forsyth, D., Torr, P., Zisserman, A. (eds.) ECCV 2008, Part II. LNCS, vol. 5303, pp. 500-513. Springer, Heidelberg, Oct. 2008.

Sullivan, G.J., et al., "Overview of the High Efficiency Video Coding (HEVC) Standard," IEEE Transactions on Circuits and Systems for Video Technology, vol. 22, No. 12, pp. 1649-1668, Dec. 2012.

Wiegand, T., et al., "Overview of the H.264/AVC Video Coding Standard," IEEE Transactions on Circuits and Systems for Video Technology, vol. 13, No. 7, Jul. 2003, pp. 560-576.

Zhu, W., et al., "Compound Image Compression by Multi-stage Prediction," IEEE Visual Communications and Image Processing (VCIP) Conference, Nov. 2012, pp. 1-6.

* cited by examiner

APPARATUS AND METHOD FOR COMPRESSING COLOR INDEX MAP

TECHNICAL FIELD

The present invention relates to video coding, and, in particular embodiments, to an apparatus and method for compressing color index map.

BACKGROUND

With the increasing number of users of new applications such as desktop sharing, online collaboration, online gaming, and remote presentation, screen content video is being increasingly generated. Screen content videos typically comprise several major colors which can be significantly different from each other and may contain sharp edges which cause, upon processing the images, significant large numbers of non-zero transform coefficients and consequently require a high bit rate. Such aspects make it challenging to efficiently encode screen content video using the available video coding standards such as H.264, developed by Joint Collaborative Team on Video Coding (JCT-VC) of the Moving Pictures Expert Group (MPEG) and of the Video Coding Experts Group (VCEG). There is a need for an efficient scheme to improve video coding of screen content.

SUMMARY OF THE INVENTION

In accordance with an embodiment, a method for image coding includes obtaining, at a video codec device, an image block, and generating a color index map comprising a plurality of entries and representing the image block, wherein each one of the entries is assigned a color index indicating a respective color. The method further includes determining whether each one of the entries is predictable by a neighboring entry in the color index map, and assigning, in a correct prediction map, a first bit-value for each one of the entries that is predictable by a neighboring entry in the color index map. Further, in the correct prediction map, a second bit-value is assigned for each one of the entries that is unpredictable by any neighboring entry in the color index map. An actual value from the color index map for the each one of the entries that is unpredictable by any neighboring entry is also added in a sequence of non-predictable color indices.

In accordance with another embodiment, a method for image coding includes obtaining, at a video codec device, an image block, selecting a plurality of major colors for the image block, and assigning, for each pixel or group of pixels in the image block, a color index in a color index map. The color index indicates a respective color from the plurality of major colors. The method further includes adding a left column and a top row to the color index map, wherein the left column and the top row comprise a plurality of entries all assigned a most probable color index in the color index map, and assigning, in a correct prediction map, a first bit-value for each color index that is predictable by a neighboring color index of a plurality of selected neighbor color indices in the color index map. Additionally, in the correct prediction map, a second bit-value is assigned for each color index that is unpredictable by any neighboring color index of the plurality of selected neighbor color indices in the color index map. An actual value of the each color index that is unpredictable by any neighboring color index of the plurality of selected neighbor color indices in the color index map is further added in a sequence of non-predictable color indices. The actual value indicates a respective color from the plurality of major colors.

In accordance with yet another embodiment, an apparatus for video coding comprises at least one processor and a non-transitory computer readable storage medium storing programming for execution by the at least one processor. The programming includes instructions to obtain an image block, and generate a color index map comprising a plurality of entries and representing the image block, wherein each one of the entries is assigned a color index indicating a respective color. The programming includes further instructions to determine whether each one of the entries is predictable by a neighboring entry in the color index map, assign, in a correct prediction map, a first bit-value for each one of the entries that is predictable by a neighboring entry in the color index map, and assign, in the correct prediction map, a second bit-value for each one of the entries that is unpredictable by any neighboring entry in the color index map. The programming also includes instructions to add, in a sequence of non-predictable color indices, an actual value from the color index map for the each one of the entries that is unpredictable by any neighboring entry.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Video coding schemes, such as HEVC, developed for compressing camera captured natural video content, may not be suitable or efficient for coding of screen content. In a scheme for screen content coding, referred to as SCM-2.0 in the development of high efficiency video coding (HEVC) extensions for coding of screen content, different modes are used to code different coding units (CUs), or blocks, of video including HEVC Intra mode, color palette mode and Intra block copy (IntraBC). The terms CU and block are used herein interchangeably to refer to an image block (e.g., comprised of pixels) considered for coding. For each largest coding unit (LCU), all possible modes and partitioning are tested and the best mode is selected based on a rate distortion criterion. When a CU is being coded in the color palette mode, all pixel values are first mapped into a set of indices, each representing a different pixel value. An index map, which shows the corresponding index for each pixel, and a color table, which denotes the mapping between pixel intensity values and color indices, are then coded. A block could also have "escape colors" which cannot be represented by any of the indices in the color table and should be coded directly.

Figure 1:
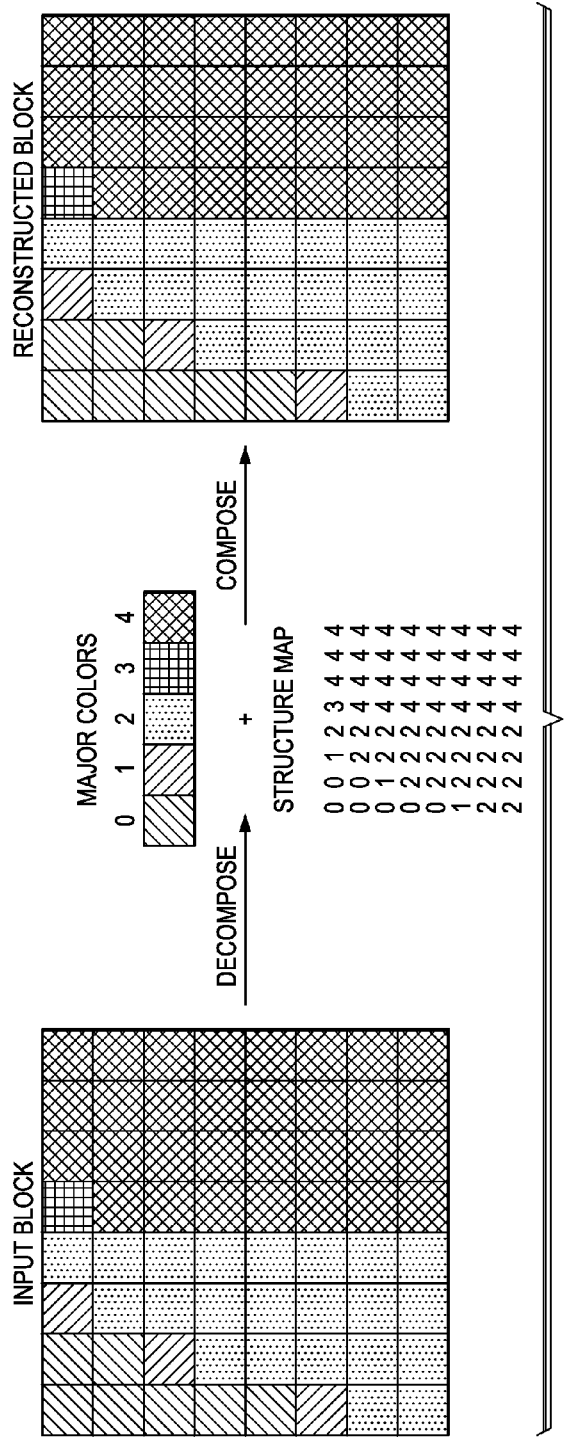
FIG. 1 shows an index map in video coding of an image block.

FIG. 1 shows an index map and major colors for a sample input block. A plurality of major colors are chosen for an input image block and assigned value respective values. For example, 5 major colors are selected and assigned the values 1 to 5. An index map, also referred to herein as an index map, is thus established that maps the appropriate major color to each portion of the block in an entry of the index or structure map. Each entry may be one or a group of pixels in the block. After coding the input block as such, the major colors' values and the index map can be transmitted (e.g., from encoder/transmitter to decoder/receiver) and then decoded to reconstruct the block.

System and method embodiments are provided herein for a scheme of compressing the color index map, which improves the efficiency of video or image coding, such as in the case of screen content images. The embodiment scheme for index map coding is a prediction-based approach. The scheme decomposes each index map into a binary map and a sequence of unpredictable indices. The binary map denotes whether an index can be predicted using its neighboring indices or not. If the index can be predicted using its neighboring indices, its corresponding value in the binary map is set to 0, otherwise its corresponding value is set to 1. Those indices which cannot be predicted using their neighbors are sent to the decoder so that the decoder can reconstruct the index map. Thus, instead of coding the index map, a binary map and a sequence of unpredictable index values is coded. This approach shows significant gain for various CUs compared with the current approach for index map coding in HEVC.

The embodiments include an algorithm for index map coding, which decomposes the index map into a binary map and a one-dimensional sequence of index values and exploits the redundancies both in the binary map and index sequence. Instead of coding an index map of size N×N (N is an integer) by coding each index value directly and independent of the other indices, a more efficient coding algorithm is used based on the prediction of at least some of the values in the map from neighboring entries. The algorithm first attempts to predict each color index in the map from its neighboring indices. If a color index can be predicted correctly at the encoder, then there is no need to code its index value since the decoder side can predict it using the same prediction scheme as the encoder. If the color index cannot be predicted, the color index is coded (e.g., assigned a major color value) and the resulting value is transmitted. Using this approach, a substantial number of indices in the map may be predicted from their neighboring indices and do not need to be coded. Therefore, a substantial number of bits can be saved in transmission.

The algorithm comprises coding or generating a map, referred to herein as a correct prediction map, in addition to a sequence of non-predictable color indices. The correct prediction map is a binary map in which an entry for a pixel is zero if its index can be predicted correctly using its neighbors in the map. Otherwise, the entry for that pixel is set to 1. The non-predictable color indices are the indices which cannot be predicted from their neighbors. The non-predictable color indices can be coded in a predefined sequence that indicates to the decoder which entries in the correct prediction map correspond to which of the color indices. For example, the sequence of non-predictable color indices includes the actual values of the unpredictable color indices in a row-by-row or column-by-column order from the color index map.

Figure 2:
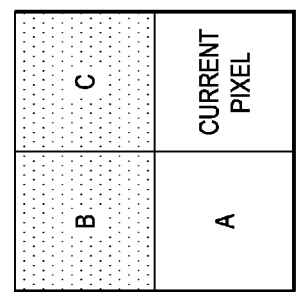
FIG. 2 shows an embodiment of neighboring pixels used for color index prediction for an image block.

In an embodiment, a plurality of three neighbors (top, left, and top-left entries) are considered to predict a color index, e.g., for a pixel, in the map. The neighboring pixels for a current considered pixel are shown in FIG. 2. Embodiments of the prediction scheme include a distance-based prediction in color intensity domain and a distance-based prediction in index domain. In the distance-based prediction in color intensity domain, to predict the index value in the current pixel position, either neighboring pixel A or C is used to predict the current index. The goal is to choose the more similar neighbor as the prediction for the current index. Specifically, the intensity variation in each one of the horizontal and vertical directions of the current pixel with its neighbors, A with B and C with B respectively, is considered and accordingly the direction with smaller variation for prediction is selected. For example, assuming $(R_A, G_A, B_A)$, $(R_B, G_B, B_B)$, $(R_C, G_C, B_C)$ denote the color intensities of indices A, B, and C, respectively, from the color table. If the horizontal variation is smaller than or equal to the vertical variation then the following relation is true:

$$\sqrt{(R_A-R_B)^2+(G_A-G_B)^2+(B_A-B_B)^2} \geq \sqrt{(R_C-R_B)^2+(G_C-G_B)^2+(B_C-B_B)^2}.$$

Therefore, the left neighbor A is used as the predicted current index. Alternatively, if the vertical variation is smaller, then pixel C is selected as the predicted index. The same method can be applied with YUV color format or other suitable color formats.

In the distance-based prediction in index domain, the index prediction is performed in index domain directly. Instead of looking at the color intensity variation in neighbor indices as in the color intensity domain scheme above, the absolute value difference with each of the neighbors is examined in the vertical and horizontal directions. For example, considering A, B, and C neighbors of the current pixel, if $|B-A| \geq |B-C|$ then the corresponding index of A is used as the prediction index. Alternatively, if $|B-A| \leq |B-C|$, the index of C is used for prediction.

Although two different prediction methods are proposed in this disclosure, only one of the prediction methods may be needed when the index map coding scheme is applied for some application. As both encoder and decoder use the same prediction method, no additional information or flag bit is needed or used to signal the decoder about which neighbor index (e.g., left or above index) should be used as the prediction for each entry in the color index map.

Additionally, for the pixels in the first column and first row, some of the neighbors are not available. To address this, the block can be expanded by adding one row and one column in which all elements are the same. The elements in the added row and column are set to the most probable index in the current block. This most probable index could be either zero or non-zero. If there are two indices that have maximum frequency, the one with the smaller value can be selected as the most probable index. As such, flag bits are sent to the decoder to signal the most probable index, e.g., in case where the indices are not ordered based on their frequencies. For instance, in the case where the maximum number of colors in the color table is 32, at most 5 bits can be used to signal the most frequent index to the decoder.

Figures 3, 5:
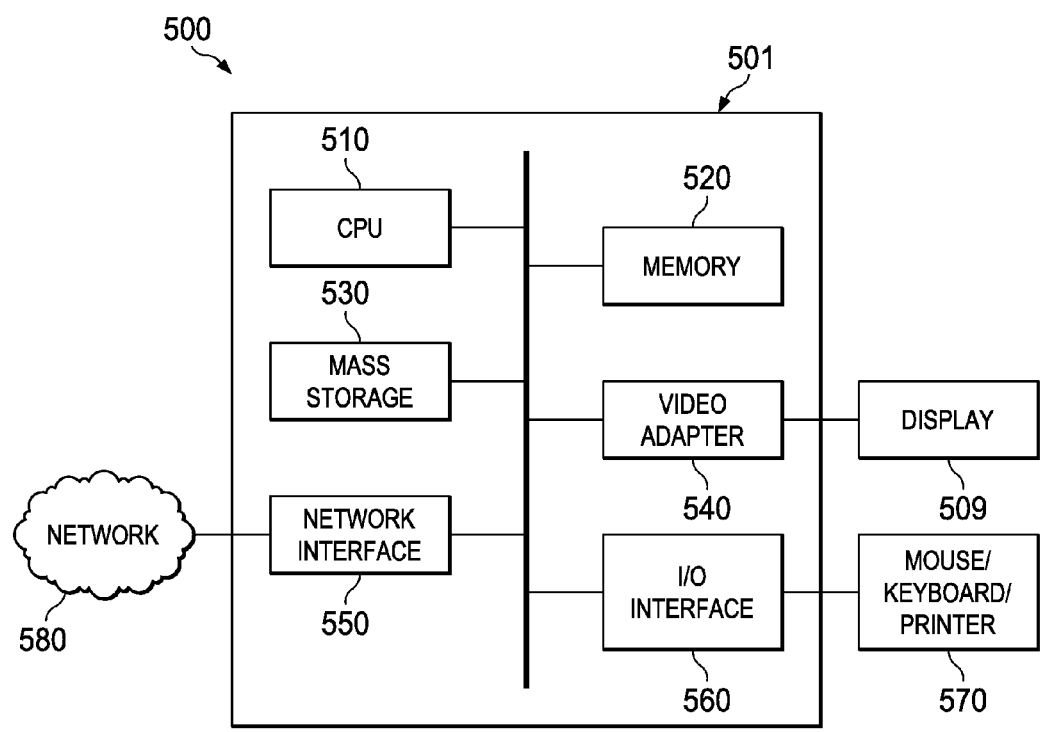
FIG. 3 shows an embodiment of a prediction map and non-predictable color indices for a sample image block.
FIG. 5 is a diagram of a processing system that can be used to implement various embodiments.

As an example, FIG. 3 shows the derivation of the prediction map and color sequence for a sample block of size 4×4. Specifically, using the distance-based prediction in the index domain for the shown index map produces the shown binary prediction map and color sequences. To account for the indices in the first column and row of the index map, a column and a row are added with all elements set to zero (since 0 is the most probable or frequently appearing index in this case). The resulting expanded index map (not shown) is then used to produce the prediction map (referred to as the correct prediction map) and the color sequence (comprising the non-predictable color indices). After the extraction of the correct prediction map and non-predictable color indices, their values can be coded and transmitted.

In an embodiment, the prediction map and color indices are coded jointly. In another embodiment, the prediction map and color indices are coded separately. For example the prediction map and color indices of the map in FIG. 3 can be jointly coded in the following format: {1, (1), 1, (0), 0, 1, (2), 1, (0), 0, 0, 0, 0, 0, 0, 1, (2), 1, (3), 0, 0}, where the numbers inside parentheses represent the index value. The index value in the sequence of coded bits can follow the bit (bit 1) indicating a non-predictable index. Alternatively, the prediction map and color indices can be separately coded in the following format: {1, 1, 0, 1, 1, 0, 0, 0, 0, 0, 0, 0, 1, 1, 0, 0} and {1, 0, 2, 0, 2, 3}, respectively. The two coding approaches may require similar bit-rates.

The binary map and the unpredictable color indices need to be coded before transmission. In an embodiment, context-adaptive binary arithmetic coding (CABAC) is used to code the binary map. For CABAC, four neighboring indices are used as the context model, resulting in 16 different context models. These four neighbors include left, top-left, top and top-right. To code 1-dimentional (1D) color sequences, the sequences are put in binary form, for instance using fixed-length coding with length=$[\log_2(N)]$, where N is the number colors from a color table. As an alternative to fixed-length coding, variable length coding, such as Truncated Binary Code (TBC), can also be used.

Figure 4:
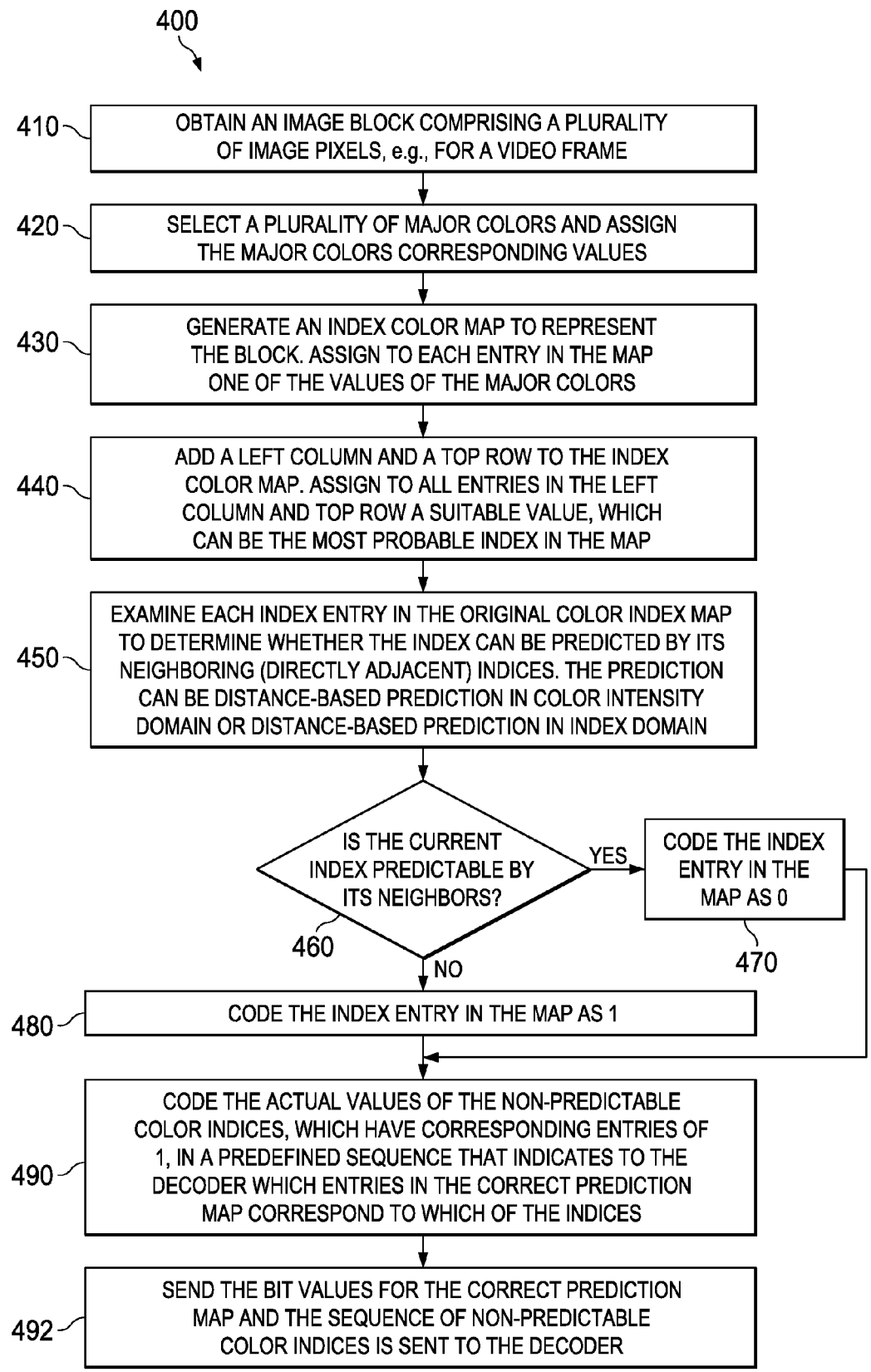
FIG. 4 shows an embodiment method for compressing a color index map.

FIG. 4 shows an embodiment method 400 in video coding. Specifically the method is performed for compressing a color index map, as part of the video coding process. At step 410, an image block is obtained. The image block comprises a plurality of image pixels, e.g., for a video frame. At step 420, a plurality of major colors are selected and assigned corresponding values. At step 430, a color index map is generated to represent the block. Each entry in the map is assigned one of the values of the major colors. At step 440, a left column and a top row is added to the color index map. All entries in the left column and top row are assigned a suitable value, which can be the most probable or frequently appearing index in the color index map. At step 450, each index entry in the original color index map (before adding the left column and top row) is examined to determine whether the index can be predicted by its neighboring (directly adjacent) indices. The prediction can be distance-based prediction in color intensity domain or distance-based prediction in index domain. At step 460, the method detects whether the current index entry under examination is predictable. If the condition in step 460 is true, then the method 400 proceeds to step 470, where the index entry in the map is coded as 0. Otherwise, if the index is not predictable, then the method 400 proceeds to step 480, where the index entry in the map is coded as 1. The resulting map is referred to as the correct prediction map. In another embodiment, the predictable index entry can be coded as 1, and the non-predictable index entry can be coded as 0. At step 490, the actual values of the non-predictable color indices, which have corresponding entries of 1, are coded in a predefined sequence that indicates to the decoder which entries in the correct prediction map correspond to which of the indices. The sequence is referred to as the sequence of non-predictable color indices. At step 492, the bit values for the correct prediction map and the sequence of non-predictable color indices is sent to the decoder. As described above, the bit values of both entities can be coded, and hence transmitted, jointly or separately.

The method above can be performed using any video codec device which can be hardware, software, or both hardware and software enabled for this purpose. In an embodiment, the video codec device is an encoder, a decoder, or a combination of both encoder and decoder, which is any hardware device with circuit components (e.g., digital circuit logic) configured for implementing the various coding steps described above. The encoder/decoder can further be configured with aid of software. The encoder/decoder can be a stand-alone device connected to a network (wired or wirelessly) or can be part of a network device, such as a server or any computing device. Examples of such devices include a video processor, a set top box, a video card, or a video chip. In another embodiment, the method and coding steps can be implemented using any general purpose processor, such as a CPU in a portable or desktop device, which is configured via software to perform the method steps.

FIG. 5 is a block diagram of a processing system 500 that can be used to implement various embodiments. The processing system 500 can be part of a BS, a UE, or other network devices. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 500 may comprise a processing unit 501 equipped with one or more input/output devices, such as a speaker, microphone, mouse, touchscreen, keypad, keyboard, printer, display, and the like. The processing unit 501 may include a central processing unit (CPU) 510, a memory 520, a mass storage device 530, a video adapter 540, and an I/O interface 560 connected to a bus. The bus may be one or more of any type of several bus architectures including a memory bus or memory controller, a peripheral bus, a video bus, or the like.

The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs. In embodiments, the memory 520 is non-transitory. The mass storage device 530 may comprise any type of storage device configured to store data, programs, and other information and to make the data, programs, and other information accessible via the bus. The mass storage device 530 may comprise, for example, one or more of a solid state drive, hard disk drive, a magnetic disk drive, an optical disk drive, or the like.

The video adapter 540 and the I/O interface 560 provide interfaces to couple external input and output devices to the processing unit. As illustrated, examples of input and output devices include a display 590 coupled to the video adapter 540 and any combination of mouse/keyboard/printer 570 coupled to the I/O interface 560. Other devices may be coupled to the processing unit 501, and additional or fewer interface cards may be utilized. For example, a serial interface card (not shown) may be used to provide a serial interface for a printer.

The processing unit 501 also includes one or more network interfaces 550, which may comprise wired links, such as an Ethernet cable or the like, and/or wireless links to access nodes or one or more networks 580. The network interface 550 allows the processing unit 501 to communicate with remote units via the networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for image coding, the method comprising:
    obtaining, at a video codec device, an image block for a video frame;
    generating, by the video codec device, a color index map comprising a plurality of entries and representing the image block, wherein the entries are assigned color indices indicating respective colors;
    attempting to predict, by the video codec device, a first color index for a first entry of the entries in accordance with a neighboring entry of the first entry in the color index map;
    in response to successfully predicting the first color index for the first entry, assigning, by the video codec device in a prediction map, a first bit-value for the first entry;
    in response to not successfully predicting the first color index for the first entry:
        assigning, by the video codec device in the prediction map, a second bit-value for the first entry; and
        adding, by the video codec device in a sequence of color indices, an actual value from the color index map for the first entry; and
    transmitting, by the video codec device to a receiver, the color map index.

2. The method of claim 1 further comprising:
    coding jointly, at the video codec device, the prediction map and the sequence of color indices into a sequence of bits; and
    sending the sequence of bits to the receiver.

3. The method of claim 2, wherein the sequence of bits includes, after a second bit-value in the sequence of bits, the actual value for the first entry.

4. The method of claim 1 further comprising:
    coding separately, at the video codec device, the prediction map and the sequence of color indices into a respective sequences of bits; and
    sending the respective sequences of bits to the receiver.

5. The method of claim 1, wherein the sequence of color indices indicates, to the receiver, which entries in the prediction map correspond to which of the indices.

6. The method of claim 1 further comprising, before the assigning and determining steps, adding a left column and a top row to the color index map, wherein the left column and the top row comprise a plurality of entries all assigned a most probable color index in the color index map.

7. The method of claim 1, wherein attempting to predict the first color index is in accordance with a distance-based prediction in color intensity domain.

8. The method of claim 7 further comprising:
    calculating a first intensity variation in a vertical direction between a left neighbor and a top-left neighbor of the first entry;
    calculating a second intensity variation in a horizontal direction between a top neighbor and the top-left neighbor of the first entry; and
    selecting a smaller intensity variation between the first intensity variation and the second intensity variation.

9. The method of claim 1, wherein attempting to predict the first color index is in accordance with a distance-based prediction in color intensity domain.

10. The method of claim 9 further comprising:
    calculating a first absolute value difference in a vertical direction between a left neighbor and a top-left neighbor of the first entry;
    calculating a second absolute value difference in a horizontal direction between a top neighbor and the top-left neighbor of the first entry; and
    selecting a smaller absolute value difference between the first absolute value difference and the second absolute value difference.

11. The method of claim 1, wherein the first bit-value and the second bit-value include zero-bit and one-bit.

12. A method for image coding, the method comprising:
    obtaining, at an video codec device, an image block for a video frame;

selecting, by the video codec device, a plurality of major colors for the image block;

assigning, by the video codec device for a pixel or a group of pixels in the image block, a color index in a color index map, wherein the color index indicates a respective color from the plurality of major colors;

adding, by the video codec device, a left column and a top row to the color index map, wherein the left column and the top row comprise a plurality of entries assigned a most probable color index in the color index map;

attempting to predict, by the video codec device, a first color index for a first entry of the entries in accordance with a neighboring entry in the color index map;

in response to successfully predicting the first color index for the first entry, assigning, by the video codec device in a prediction map, a first bit-value for the first color index;

in response to not successfully predicting the first color index for the first entry:

assigning, by the video codec device, in the prediction map, a second bit-value for the first color index; and adding, by the video codec device, in a sequence of color indices, an actual value of the first color index, wherein the actual value indicates a respective color from the plurality of major colors; and transmitting, by the video codec device to a receiver, the color map index.

13. The method of claim 12 further comprising:

coding, at the video codec device, the prediction map and the sequence of color indices into a sequence of bits; and sending the sequence of bits to the receiver.

14. The method of claim 13, wherein the prediction map and the sequence of color indices are coded using context-adaptive binary arithmetic coding (CABAC).

15. The method of claim 12, wherein the sequence of color indices includes the actual value of the first color index in a row-by-row or column-by-column order from the color index map.

16. The method of claim 12, wherein the plurality of selected neighbor color indices for the first color index in the color index map include a left neighbor color index adjacent to the color index, a top neighbor color index adjacent to the color index, and a top-left neighbor color index adjacent to the left neighbor color index and the top neighbor color index.

17. A video codec apparatus, the video codec apparatus comprising:

at least one processor; and a non-transitory computer readable storage medium storing programming for execution by the at least one processor, the programming including instructions to:

obtain an image block for a video frame;

generate a color index map comprising a plurality of entries and representing the image block, wherein the entries are assigned color indices indicating respective colors;

attempt to predict a first color index for a first entry of the entries in accordance with a neighboring entry in the color index map;

in response to successfully predicting the first color index for the first entry, assign, in a prediction map, a first bit-value for the first entry;

in response to not successfully predicting the first color index for the first entry:

assign, in the prediction map, a second bit-value for the first entry; and add, in a sequence of color indices, an actual value from the color index map for the first entry; and transmit, to a receiver, the color map index.

18. The video codec apparatus of claim 17, wherein the programming includes further instructions to:

code jointly the prediction map and the sequence of color indices into a sequence of bits, wherein the sequence of bits includes, after the second bit-value in the sequence of bits, the actual value from the color index map for the first entry; and send the sequence of bits to receiver.

19. The video codec apparatus of claim 17, wherein the programming includes further instructions to: code separately the prediction map and the sequence of color indices into a respective sequences of bits; and send the respective sequences of bits to the receiver.

20. The video codec apparatus of claim 17, wherein the sequence of color indices includes the actual value of the first color index in a row-by-row or column-by-column order from the color index map.

* * * * *